United States Patent
Setomoto et al.

(10) Patent No.: US 10,270,613 B2
(45) Date of Patent: Apr. 23, 2019

(54) LAYOUT CREATION METHOD AND LIGHT POSITION REGISTRATION SYSTEM

(71) Applicant: PANASONIC INTELLECTUAL PROPERTY MANAGEMENT CO., LTD., Osaka (JP)

(72) Inventors: Tatsumi Setomoto, Osaka (JP); Kentaro Yamauchi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/866,049

(22) Filed: Jan. 9, 2018

(65) Prior Publication Data
US 2018/0212794 A1 Jul. 26, 2018

(30) Foreign Application Priority Data
Jan. 23, 2017 (JP) .................. 2017-009306

(51) Int. Cl.
| | | |
|---|---|---|
| G08B 1/00 | (2006.01) |
| H04W 4/02 | (2018.01) |
| G01C 21/20 | (2006.01) |
| H04L 12/28 | (2006.01) |
| H04W 4/38 | (2018.01) |
| H04W 4/33 | (2018.01) |
| H04M 3/00 | (2006.01) |

(52) U.S. Cl.
CPC ...... *H04L 12/2809* (2013.01); *H04L 12/2812* (2013.01); *H04L 12/2827* (2013.01); *H04W 4/02* (2013.01); *H04W 4/33* (2018.02); *H04W 4/38* (2018.02); *G01C 21/20* (2013.01); *G08B 1/00* (2013.01); *H04M 3/00* (2013.01)

(58) Field of Classification Search
CPC .......... G08B 1/00; G01C 21/20; G01B 11/14; H05B 37/00; H04M 3/00; H04N 7/18
USPC ........ 340/4.34; 455/419; 705/7.34; 370/338; 356/614
See application file for complete search history.

(56) References Cited

U.S. PATENT DOCUMENTS

| | | | | |
|---|---|---|---|---|
| 7,969,297 B2 * | 6/2011 | Haartsen | .................. | G01S 1/70 340/531 |
| 8,248,467 B1 * | 8/2012 | Ganick | ................ | G01C 21/206 340/13.24 |

(Continued)

FOREIGN PATENT DOCUMENTS

| | | |
|---|---|---|
| JP | 3873148 B2 | 1/2007 |
| JP | 4173091 B2 | 10/2008 |

(Continued)

*Primary Examiner* — Nam V Nguyen
(74) *Attorney, Agent, or Firm* — McDermott Will & Emery LLP

(57) ABSTRACT

Provided is a layout creation method for creating a layout of apparatuses disposed in a space (such as lighting devices, air conditioners, and switches). The layout creation method includes: obtaining reference coordinates through a portable terminal having a position sensing function; and for each of the apparatuses, obtaining position coordinates corresponding to the apparatus as coordinates relative to the reference coordinates through the portable terminal, and storing the position coordinates on the portable terminal in association with a type of the apparatus.

11 Claims, 7 Drawing Sheets

(56) References Cited

U.S. PATENT DOCUMENTS

| | | | |
|---|---|---|---|
| 8,446,110 B2* | 5/2013 | Tanigawa | H05B 37/0227 315/312 |
| 8,515,413 B1* | 8/2013 | Schilit | H04W 4/80 455/419 |
| 8,565,791 B1* | 10/2013 | Schilit | H04W 64/00 455/41.1 |
| 8,994,799 B2* | 3/2015 | Ganick | G01S 1/70 348/61 |
| 9,374,160 B2* | 6/2016 | Park | H04B 10/1149 |
| 9,723,219 B2* | 8/2017 | Ryan | H04N 5/2353 |
| 9,723,676 B2* | 8/2017 | Ganick | G01S 1/70 |
| 9,888,203 B2* | 2/2018 | Ryan | H04N 5/455 |
| 2007/0177161 A1* | 8/2007 | Ishii | G01S 1/70 356/614 |
| 2011/0153201 A1* | 6/2011 | Park | G01C 21/20 701/533 |
| 2012/0252495 A1* | 10/2012 | Moeglein | G01S 19/26 455/456.3 |
| 2016/0092101 A1* | 3/2016 | Arinobu | G06F 3/12 358/1.15 |
| 2017/0265284 A1* | 9/2017 | Yamauchi | H05B 37/0272 |
| 2017/0265285 A1* | 9/2017 | Ueno | H05B 37/0272 |

FOREIGN PATENT DOCUMENTS

| | | |
|---|---|---|
| JP | 2009-140855 A | 6/2009 |
| JP | 2015-005369 A | 1/2015 |
| JP | 2015-012537 A | 1/2015 |
| WO | 02/099780 A2 | 12/2002 |

\* cited by examiner

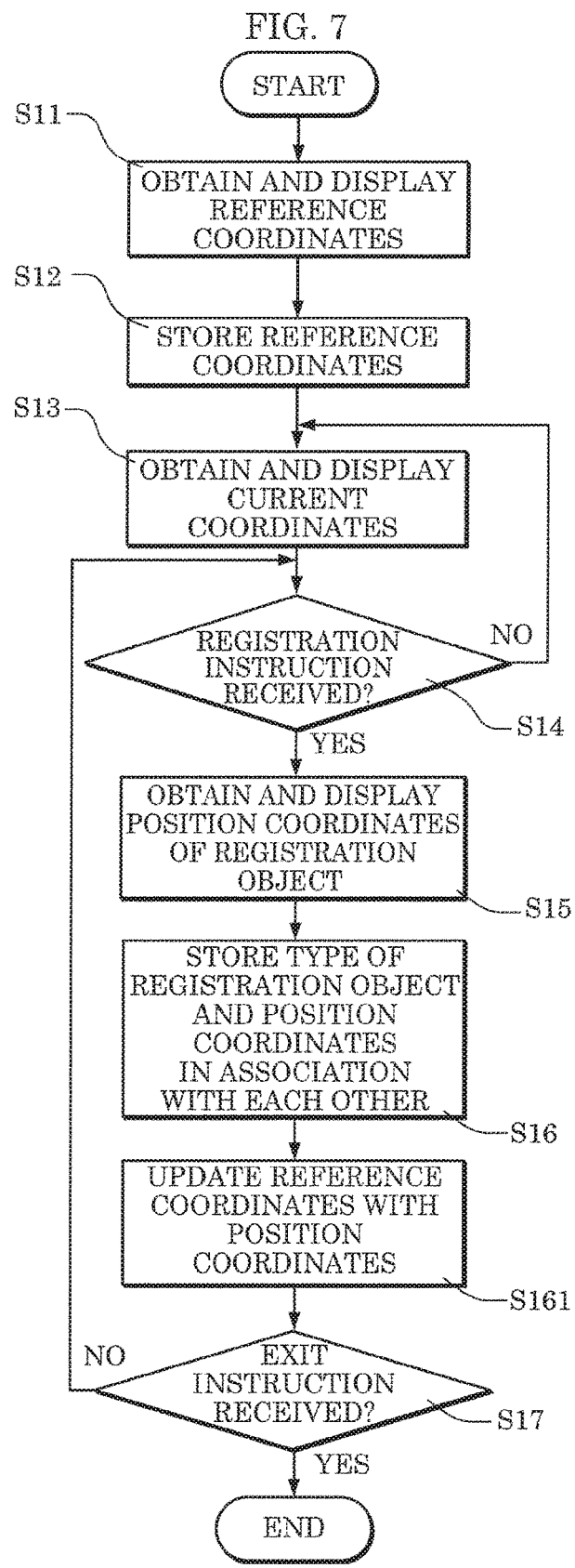

LAYOUT CREATION METHOD AND LIGHT POSITION REGISTRATION SYSTEM

CROSS REFERENCE TO RELATED APPLICATION

This application claims the benefit of priority of Japanese Patent Application Number 2017-009306 filed on Jan. 23, 2017, the entire content of which is hereby incorporated by reference.

BACKGROUND

1. Technical Field

The present disclosure relates to a layout creation method and a light position registration system.

2. Description of the Related Art

In recent years, some of apparatuses disposed in facilities, such as lighting devices, are equipped with wireless functionality. In such apparatuses, pairing is required at the time of installation. For example, Japanese Patent No. 4173091 discloses pairing techniques in which a layout of an arrangement of lighting devices is used to associate actual lighting devices with their respective positions in the layout.

SUMMARY

In pairing, it is necessary to prepare a layout in advance, and it takes a lot of time and effort to create the layout in advance for each of facilities.

In view of the forgoing, an object of the present disclosure is to provide a layout creation method and a light position registration system which are capable of creating a layout of apparatuses in easy way.

A layout creation method according to one aspect of the present disclosure is a layout creation method for creating a layout of a plurality of apparatuses disposed in a space, the layout creation method comprising: obtaining reference coordinates through a portable terminal having a position sensing function; and for each of the plurality of apparatuses, obtaining position coordinates corresponding to the apparatus as coordinates relative to the reference coordinates through the portable terminal, and storing the position coordinates on the portable terminal in association with a type of the apparatus.

A light position registration system according to one aspect of the present disclosure is a light position registration system that registers a position for each of a plurality of lighting devices disposed in a space, the light position registration system comprising a portable terminal having a position sensing function, wherein the portable terminal obtains reference coordinates, and obtains and stores position coordinates corresponding to the lighting device as coordinates relative to the reference coordinates.

According to the present disclosure, it is possible to provide a layout creation method and a light position registration system which are capable of creating a layout of apparatuses in easy way.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 7 is a flowchart illustrating a procedure of a layout creation method according to Variation 1.

DETAILED DESCRIPTION OF THE EMBODIMENTS

Hereinafter, a layout creation method and a light position registration system according to embodiments of the present disclosure are described with reference to the accompanying drawings. The embodiments described below are each merely one specific example of the present disclosure. Thus, values, shapes, materials, components, and arrangement and connection between the components, and steps and order of the steps shown in the following embodiments are merely by way of illustration and not intended to limit the present disclosure. Therefore, among the components in the embodiments below, components not recited in any one of the independent claims defining the most generic part of the inventive concept of the present disclosure are described as arbitrary components. The figures are schematic illustrations and do not necessarily illustrate the present disclosure precisely. In the figures, the same reference sign is used to refer to the same component.

Embodiment

[Light Position Registration System]

First, light position registration system 10 according to an embodiment of the present disclosure is described with reference to the accompanying drawings.

Figure 1:
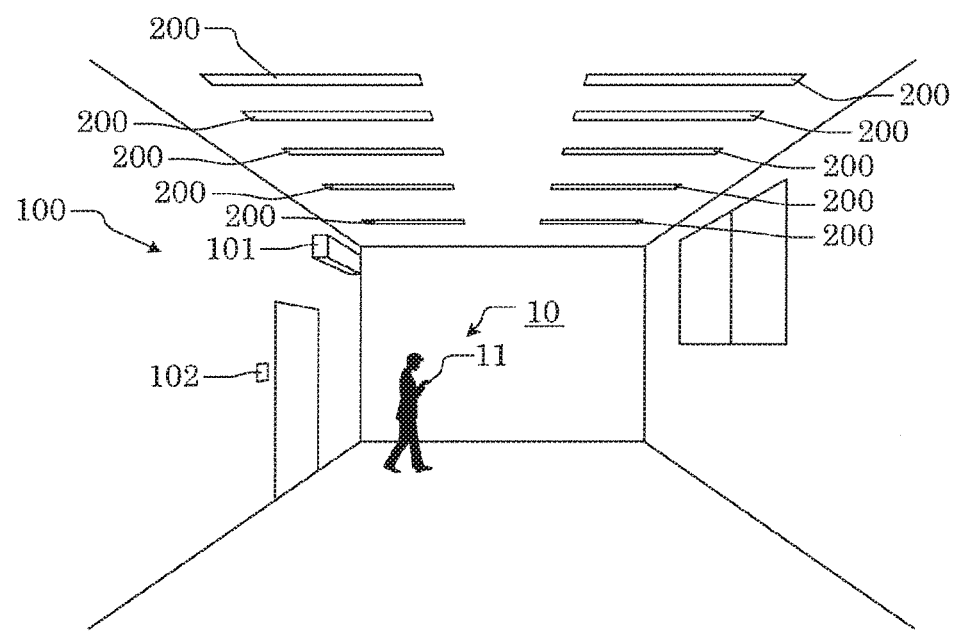
FIG. 1 schematically illustrates an exemplary configuration of a light position registration system according to an embodiment.

FIG. 1 schematically illustrates an exemplary configuration of light position registration system 10 according to the embodiment. As shown in FIG. 1, light position registration system 10 is a system that registers position coordinates for each of lighting devices 200 disposed or fixed in space 100 such as in a room. Besides lighting devices 200, this light position registration system 10 may register other apparatuses disposed in space 100. For example, such other apparatuses may include electronic devices, fixtures, and/or emergency equipment disposed in space 100. The electronic devices may include an air conditioner, a television set, a personal computer, a printer, a multifunction product, a refrigerator, and/or a microwave. The electronic devices may also include an operation switch for operating lighting devices 200 or an air conditioner. The fixtures may include a desk, a chair, a shelf, and/or a partition. The emergency equipment may include an alarm box and/or a fire extinguisher. FIG. 1 illustrates an exemplary case in which lighting devices 200 are arranged in a 5×2 grid on a ceiling, air conditioner 101 is disposed on a wall, switch 102 for operating lighting devices 200 is disposed on a wall near a door. Hereinafter, an apparatus to be registered by light position registration system 10 is referred to as a registration object.

[Portable Terminal]

Next, light position registration system 10 includes portable terminal 11 having a position sensing function. Portable terminal 11 may be any terminal that is portable and operable by a user. For example, portable terminal 11 may be a dedicated device for position registration, or an information terminal such as a smartphone, a mobile phone, a tablet terminal, or a laptop computer. When portable terminal 11 is embodied as an information terminal, portable terminal 11 executes an application for position registration to register position coordinates of registration objects individually and create a layout based on these position coordinates of the registration objects.

Figure 2:
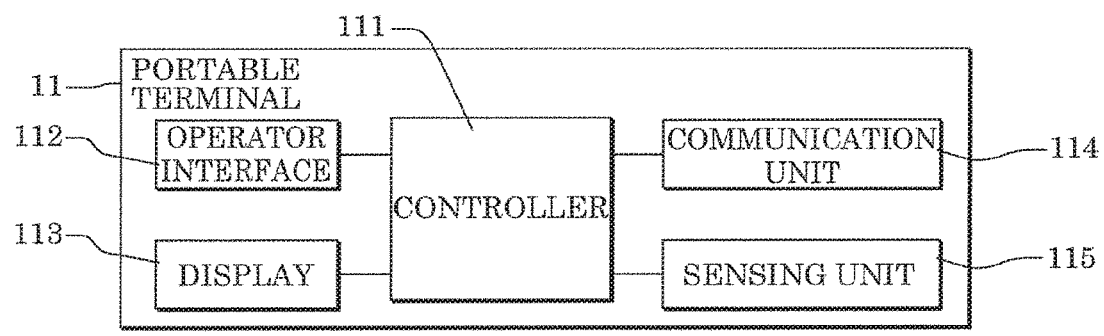
FIG. 2 is a block diagram illustrating a control configuration of a portable terminal according to the embodiment.

FIG. 2 is a block diagram illustrating a control configuration of portable terminal 11 according to the embodiment.

As shown in FIG. 2, portable terminal 11 includes controller 111, operator interface 112, display 113, communication unit 114, and sensing unit 115.

Controller 111 includes a CPU (central processing unit) and a memory, and controls operator interface 112, display 113, communication unit 114, and sensing unit 115. Specifically, controller 111 executes the application for position registration in the memory to control each of the units (operator interface 112, display 113, communication unit 114, and sensing unit 115), thereby allowing the position coordinates of the registration objects to be registered individually.

Operator interface 112 may be a touch panel that also serves as display 113. Through user operation of operator interface 112, controller 111 receives instructions such as execution of the application, and registration of the registration objects.

Display 113 may be a liquid crystal display monitor, which displays registration image G1 (described later; see FIG. 3, etc.), layout F1 of the registration objects, and movement path L1 of portable terminal 11 in the process of creating layout F1.

Communication unit 114 includes an antenna and a wireless module, which communicates with the Internet, external devices, or the like.

Sensing unit 115 is a member for sensing the position and attitude of portable terminal 11, which includes an acceleration sensor, a gyro sensor, an electronic compass, and a GPS (Global Positioning System) sensor. The acceleration sensor is a sensor for sensing the acceleration about two orthogonal axes of portable terminal 11. The gyro sensor is a sensor for sensing the angular velocity of portable terminal 11. The electronic compass (a digital compass, an orientation sensing element, or a geomagnetic sensor) is a sensor for sensing the orientation of portable terminal 11 by sensing the intensity of magnetic field (geomagnetic field) in three orthogonal axes of portable terminal 11. The GPS sensor receives a GPS signal from GPS satellites located above portable terminal 11, and 3-dimensionally measures a current position of portable terminal 11 based on the received GPS signal. By using the combined measurements of these parts of sensing unit 115, controller 111 obtains current coordinates of portable terminal 11.

[Registration Image]

Figure 3:
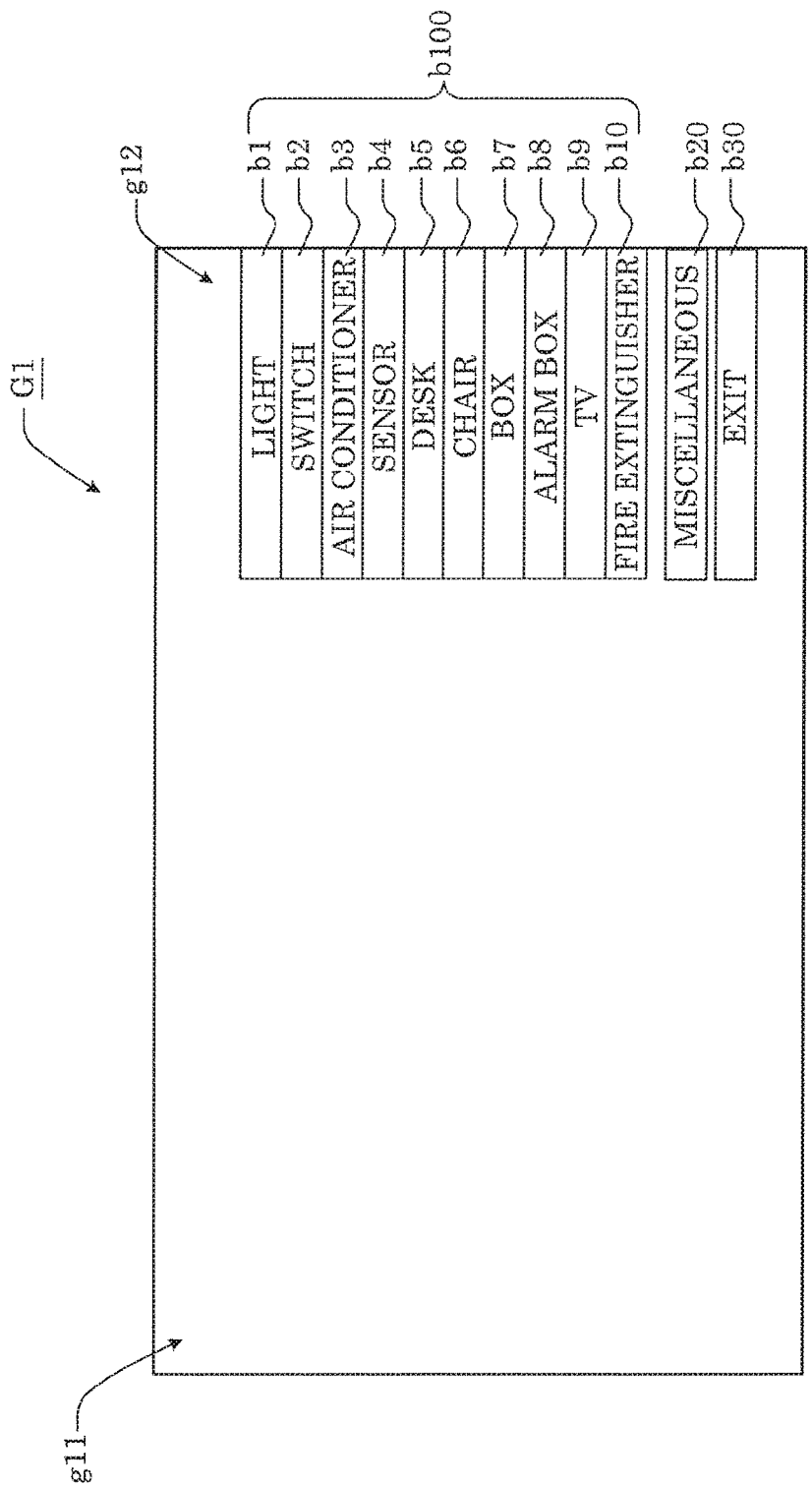
FIG. 3 schematically illustrates an exemplary registration image displayed on the portable terminal according to the embodiment.

The following describes a registration image at the time of creating a layout. FIG. 3 schematically illustrates an example of registration image G1 displayed on portable terminal 11 according to the embodiment. It should be noted that FIG. 3 illustrates registration image G1 at the beginning of registration. Registration image G1 includes creation area g11 in which layout F1 is created, and operation area g12 in which various operation buttons for creating layout F1 are displayed. Operation area g12 is concentrated on one side of registration image G1 (in FIG. 3, right side), and creation area g11 is provided in the remaining region of registration image G1.

Operation area g12 includes a set of selection buttons b100 in which types of registration objects are displayed as a list of options, delete button b20 for deleting the registration contents, and exit button b30 for exiting the application for position registration. The set of selection buttons b100 includes light button b1 representing lighting devices, switch button b2 representing switches, air conditioner button b3 representing air conditioners, sensor button b4 representing sensors, desk button b5 representing desks, chair button b6 representing chairs, alarm box button b7 representing alarm boxes, fire extinguisher button b8 representing fire extinguishers, TV button b9 representing television sets, and miscellaneous button b10 representing any other types of registration objects. A user can create layout F1 in creation area g11 by operating the buttons provided in operation area g12. When one of selection buttons b100 is operated, controller 111 receives a registration instruction corresponding to this button via operator interface 112. Based on the measurements of sensing unit 115 at the time of receiving the registration instruction, controller 111 obtains current position coordinates (current coordinates) of portable terminal 11, associates the obtained current coordinates with the type of registration object corresponding to the registration instruction, and displays an icon in creation area g11. Layout F1 is created by repeating this process.

[Layout Creation Method]

Figure 4:
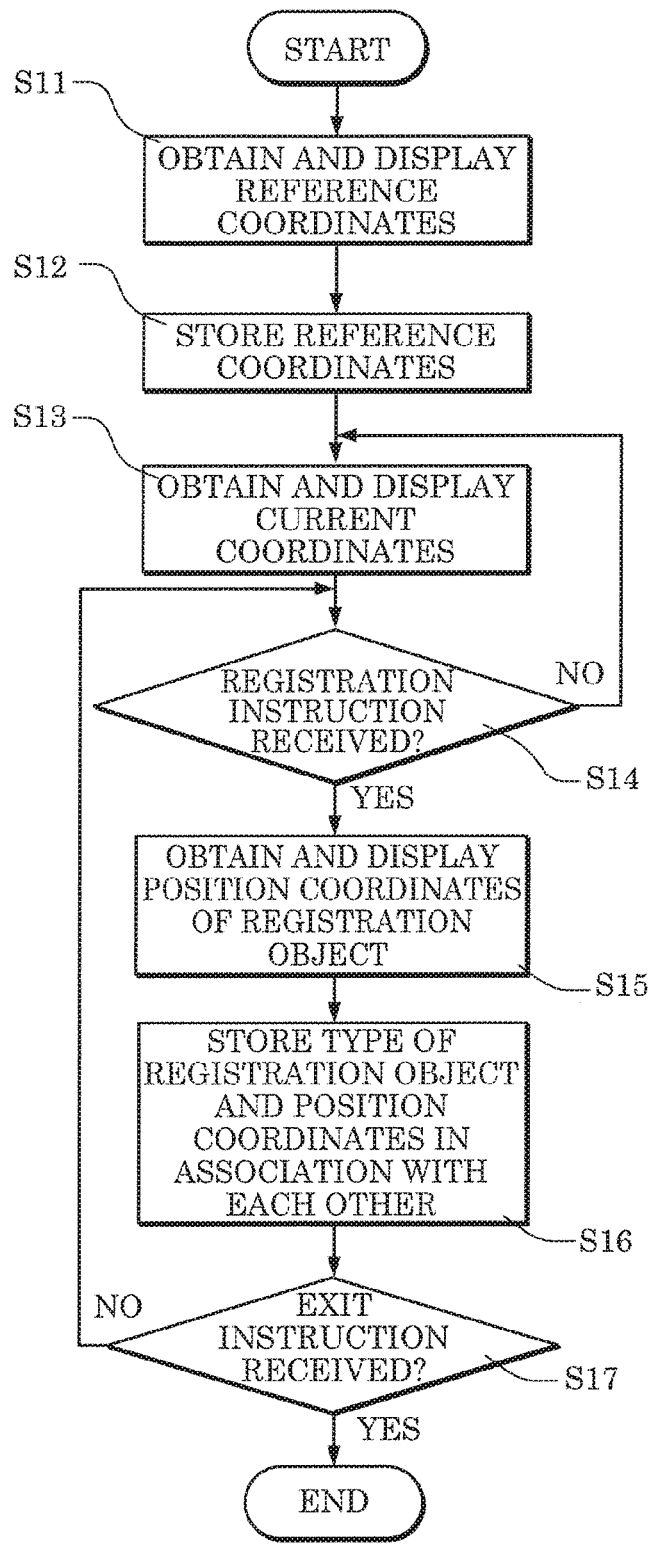
FIG. 4 is a flowchart illustrating a procedure of a layout creation method according to the embodiment.
Figure 5:
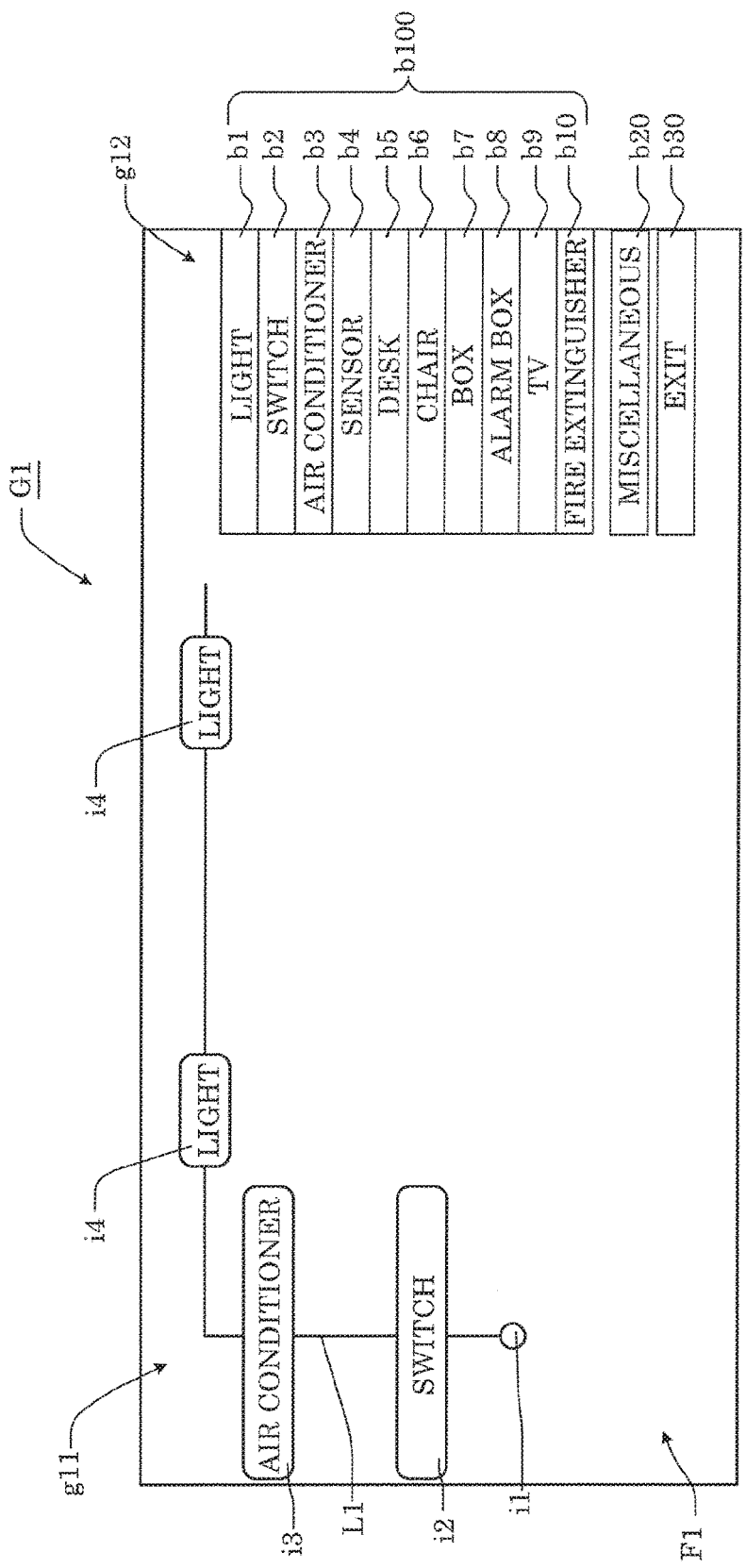
FIG. 5 schematically illustrates the registration image in the process of creating a layout according to the embodiment.
Figure 6:
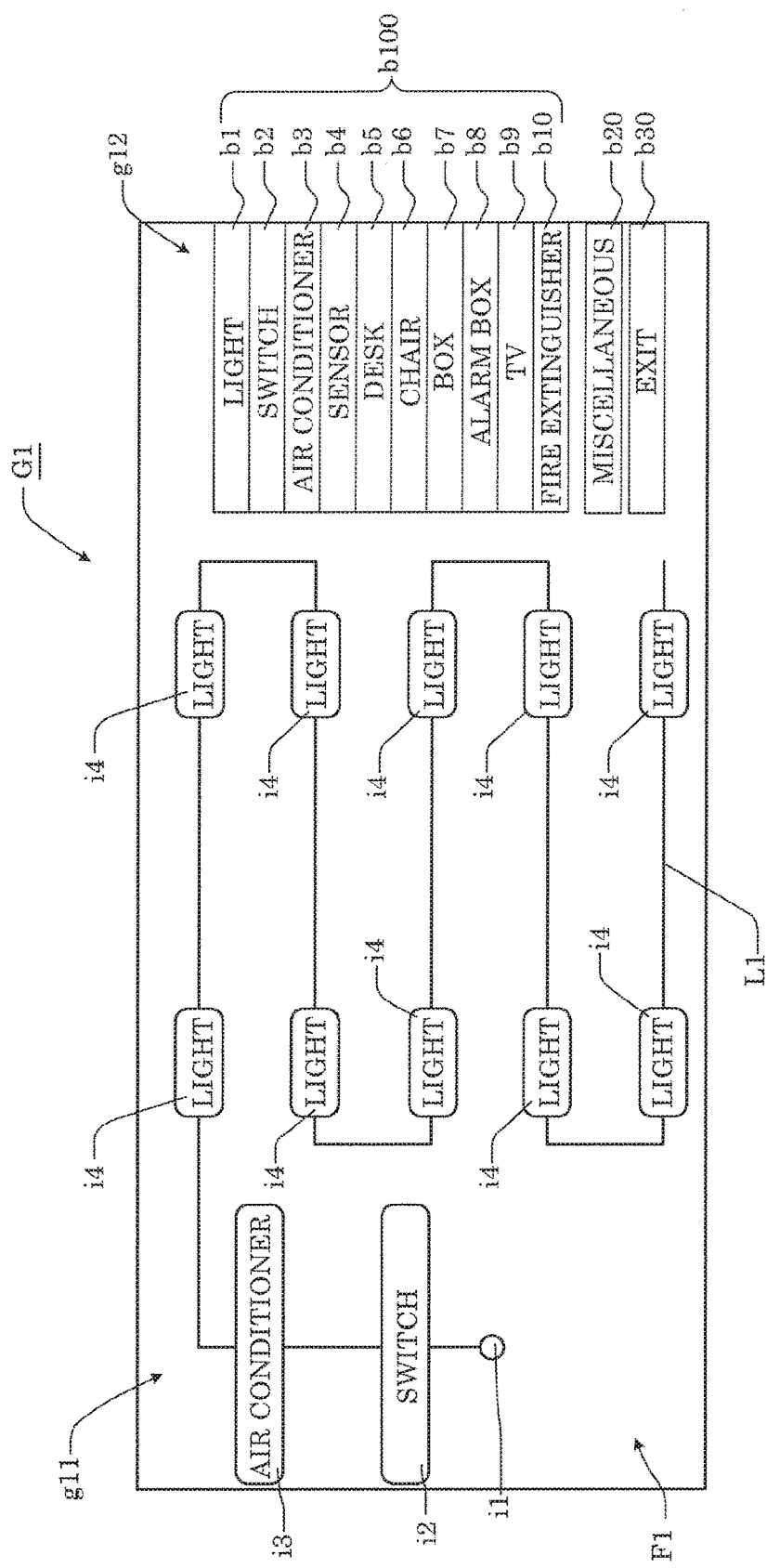
FIG. 6 schematically illustrates the registration image with the completed layout according to the embodiment.

The following describes a layout creation method using portable terminal 11. FIG. 4 is a flowchart illustrating a procedure of a layout creation method according to the embodiment. FIG. 5 schematically illustrates registration image G1 in the process of creating layout F1 according to the embodiment. FIG. 6 schematically illustrates registration image G1 with completed layout F1 according to the embodiment.

The layout creation method starts with an execution of the application for position registration by portable terminal 11. At step S11 shown in FIG. 4, controller 111 of portable terminal 11 obtains a starting position of portable terminal 11 as reference coordinates, based on the measurements of sensing unit 115 at the time of starting the application for position registration. Controller 111 controls display 113 to display icon i1 representing a reference position (the starting position) in a position corresponding to the reference coordinates in creation area g11. After this, the processing of controller 111 proceeds to step S12.

At step S12, controller 111 stores the reference coordinates in the memory, and the processing proceeds to step S13. It should be noted that after this step, the current coordinates of portable terminal 11 are obtained as coordinates relative to the reference coordinates. Specifically, by using the combined measurements of the sensors included in sensing unit 115 (an acceleration sensor, a gyro sensor, an electronic compass, and a GPS sensor), a difference from the reference coordinates is calculated as the current coordinates.

At step S13, controller 111 obtains a current position of portable terminal 11 as the current coordinates based on the measurements of sensing unit 115 at the present time. Controller 111 controls display 113 to display a line connecting the starting position and the current position corresponding to the current coordinates in creation area g11. After this, the processing of controller 111 proceeds to step S14.

At step S14, controller 111 determines whether or not portable terminal 11 receives the registration instruction. Specifically, the user moves closer to a registration object in space 100, and selects and touches the button corresponding to the type of the registration object from among selection buttons b100. In this manner, controller 111 receives the registration instruction corresponding to the touched button (step S14; YES). After this, the processing of controller 111 proceeds to step S15. If controller 111 receives no registration instruction (step S14; NO), the processing of controller 111 proceeds back to step S13.

It should be noted that when it is determined to be "NO" at step S14, i.e. when the processing proceeds back to step S13, controller 111 obtains a new current position of portable terminal 11 as the current coordinates and then controls display 113 to display a line connecting the last current position and the new current position corresponding to the current coordinates in creation area g11. In this manner, a movement path of portable terminal 11, i.e. movement path L1 of the user, is displayed in creation area g11.

At step S15, controller 111 obtains the current coordinates of portable terminal 11 as position coordinates of the registration object, based on the measurements of sensing unit 115 at the time of receiving the registration instruction, i.e. in the vicinity of the registration object. Controller 111 controls display 113 to display an icon representing the type of the registration object in a position corresponding to the position coordinates of the registration object in creation area g11. After this, the processing of controller 111 proceeds to step S16.

At step S16, controller 111 stores the type of registration object and its position coordinates in association with each other in the memory, and the processing proceeds to step S17.

At step S17, controller 111 determines whether or not portable terminal 11 receives an exit instruction. Specifically, when the user touches exit button b30, controller 111 receives the exit instruction (step S17; YES). In this manner, controller 111 exits the application for position registration. If controller 111 does not receive the exit instruction (step S17; NO), the processing of controller 111 proceeds back to step S14. Layout F1 is created by repeating steps S14 to S16.

[Operation Procedure]

The following describes the operation procedure in registration image G1 with reference to FIG. 5 and FIG. 6.

First, a user executes an application for position registration on portable terminal 11. This causes icon i1 representing a starting position of portable terminal 11 to be displayed in creation area g11 of registration image G1. After this, when the user moves to the first registration object (switch 102), its movement path L1 is displayed in creation area g11. The top end of movement path L1 (distal end from the starting point) is a current position of portable terminal 11. When the user arrives in the vicinity of the first registration object and then operates a button corresponding to the type of the first registration object (switch button b2), an icon representing the type of the first registration object (switch icon i2) is displayed in a position corresponding to the position coordinates of the first registration object in creation area g11.

Subsequently, when the user moves to the second registration object (air conditioner 101), its movement path L1 is displayed in creation area g11. When the user arrives in the vicinity of the second registration object and operates a button corresponding to the type of the second registration object (air conditioner button b3), an icon representing the type of the second registration object (air conditioner icon i3) is displayed in a position corresponding to the position coordinates of the second registration object in creation area g11.

Subsequently, when the user moves to the third registration object (one of lighting devices 200), its movement path L1 is displayed in creation area g11. When the user arrives in the vicinity of the third registration object and operates a button corresponding to the type of the third registration object (light button b1), an icon representing the type of the third registration object (light icon i4) is displayed in a position corresponding to the position coordinates of the third registration object in creation area g11. As shown in FIG. 6, layout F1 is created in creation area g11 by repeating these steps for each of the registration objects.

[Effects]

As described above, the present embodiment discloses a layout creation method for creating layout F1 of apparatuses disposed in space 100. The layout creation method includes: obtaining reference coordinates through portable terminal 11 having a position sensing function; and for each of the plurality of apparatuses, obtaining position coordinates corresponding to the apparatus as coordinates relative to the reference coordinates through portable terminal 11, and storing the position coordinates on portable terminal 11 in association with a type of the apparatus.

The present embodiment also discloses light position registration system 10 for registering a position for each of lighting devices 200 disposed in space 100. Light position registration system 10 includes portable terminal 11 having a position sensing function, in which portable terminal 11 obtains reference coordinates, and obtains and stores position coordinates corresponding to lighting device 200 as coordinates relative to the reference coordinates.

With this configuration, position coordinates of the apparatuses (registration objects) including lighting devices 200 are stored using the position sensing function of portable terminal 11, and thus layout F1 can be created based on the stored position coordinates. In particular, the position coordinates of the apparatuses are obtained as coordinates relative to the reference coordinates, and thus it is possible to ensure that the position coordinates of the apparatuses are obtained even in a room in which there is a reduction in sensitivity to a GPS signal for example.

In addition, a user can carry portable terminal 11 and operate portable terminal 11 while moving around space 100 to store the position coordinates of the apparatuses on portable terminal 11, and thus it is possible to easily create layout F1.

Moreover, a position of the apparatus may be displayed on portable terminal 11 based on the position coordinates of the apparatus.

With this configuration, the positions of the apparatuses are displayed on portable terminal 11, and thus it is possible to check created layout F1 on portable terminal 11 at hand.

Moreover, a current position of portable terminal 11 and the position of the apparatus may be displayed on portable terminal 11.

With this configuration, the current position of portable terminal 11 is also displayed on portable terminal 11 together with the positions of the apparatuses, and thus it is possible to easily let the user know a relationship between the current position and the positions of the registered apparatuses.

Moreover, the apparatuses may be fixed in space 100.

With this configuration, it is possible to easily create layout F1 of apparatuses fixed in space 100.

Moreover, the apparatuses may include at least lighting device 200.

With this configuration, it is possible to easily create layout F1 including lighting device 200.

[Variation 1]

The above embodiment has been described with reference to the reference coordinates obtained at the beginning of the execution of the application for position registration and employed until the end of the application. However, the reference coordinates may be updated in the middle of the execution of the application. Specifically, after obtaining position coordinates of a registration object, controller 111 updates the reference coordinates with the position coordinates as new reference coordinates.

FIG. 7 is a flowchart illustrating a procedure of a layout creation method according to variation 1. In the flowchart shown in FIG. 7, step S161 is added between steps S16 and S17 according to the above embodiment. In other words, in variation 1, the steps other than step S161 are the same as ones of the above embodiment, and their descriptions are omitted here.

At step S161, controller 111 of portable terminal 11 updates the reference coordinates with the position coordinates of the registration object obtained at step S15 as new reference coordinates, and the processing proceeds to step S17. In other words, after this step, the reference coordinates are updated before the position coordinates of a next registration object are obtained. In other words, every time the position coordinates of the registration object are obtained, the position coordinates of the immediately preceding registration object are used as the reference coordinates. In this manner, it is possible to correctly store a positional relationship between two temporally successive registration objects at the time of registration.

[Other Embodiments]

While the layout creation method and the light position registration system according to the present disclosure have been described with reference to the above embodiment and the variation thereof, the present disclosure is not limited to the above embodiment and the variation thereof.

For example, the above embodiment has been described with reference to the reference coordinates obtained at the beginning of the execution of the application for position registration. However, the reference coordinates may be obtained at any time before registration of the first registration object. In addition, the position coordinates of the first registration object may be employed as the reference coordinates until the end of the application.

Moreover, the above embodiment has been described with reference to controller 111 which obtains the current coordinates of portable terminal 11 using the combined measurements of the parts in sensing unit 115 (the acceleration sensor, the gyro sensor, the electronic compass, and the GPS sensor). However, for example, if a beacon transmitter is disposed in space 100, controller 111 may obtain the coordinates of the current position of portable terminal 11 based on a beacon (predetermined radio waves) received by communication unit 114. Alternatively, controller 111 may obtain the coordinates of the current position of portable terminal 11 using the beacon in combination with the measurements of the parts in sensing unit 115.

Moreover, the present embodiment has been described with reference to layout F1 displayed on portable terminal 11. However, the layout may be displayed on an external device by providing, from portable terminal 11 to the external device, the position coordinates stored on portable terminal 11 and the type of apparatus associated with the position coordinates.

In other instances, various modifications to the exemplary embodiment according to the present disclosure described above that may be conceived by a person skilled in the art and embodiments implemented in any combination of the components and functions shown in the exemplary embodiment are also included within the scope of the present disclosure, without departing from the spirit of the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A layout creation method for creating a layout of a plurality of registration objects including a lighting device and an apparatus other than a lighting device, which are disposed in a space, the layout creation method comprising:

obtaining reference coordinates through a portable terminal having a position sensing function; and obtaining coordinates, relative to the reference coordinates, of the portable terminal, as position coordinates corresponding to a given registration object among the plurality of registration objects, and storing the position coordinates of the given registration object on the portable terminal in association with a type of the given registration object;

repeating the obtaining and the storing, while changing a location of the portable terminal; and displaying, as the layout, positions of the plurality of registration objects together with types of the plurality of registration objects, respectively.

2. The layout creation method according to claim 1, wherein the layout is displayed on the portable terminal.

3. The layout creation method according to claim 1, wherein:

the portable terminal includes a set of selection buttons in which types of the plurality of registration objects are displayed as options, and in response to one of the selection buttons being operated, the portable terminal obtains current position coordinates of the portable terminal, as the position coordinates of the given registration object, and stored the position coordinates in association with the type of the given registration object, the type of the given registration object corresponding to the operated one of the selection buttons.

4. The layout creation method according to claim 3, further comprising displaying a current position of the portable terminal and the position of the registration object on the portable terminal.

5. The layout creation method according to claim 3, further comprising updating the reference coordinates with the obtained coordinates of the portable terminal as new reference coordinates.

6. The layout creation method according to claim 3, wherein the plurality of registration objects are fixed in the space.

7. A light position registration system that registers a position for each of a plurality of registration objects including a lighting device and an apparatus other than a lighting apparatus, which are disposed in a space, the light position registration system comprising
a portable terminal having a position sensing function, wherein
the portable terminal:
obtains reference coordinates by using the position sensing function,
obtains coordinates, relative to the reference coordinates, of the portable terminal, as position coordinates corresponding to a given registration object among the plurality of registration objects, and stores the position coordinates of the given registration object in associate with a type of the give registration object,
repeat the obtaining and the storing for the plurality of registration objects disposed in different locations in the space; and
displays, as a layout of the plurality of registration objects, positions of the plurality of registration objects together with types of the plurality of registration objects, respectively.

8. The light position registration system according to claim 7,
wherein the layout is displayed on the portable terminal.

9. The light position registration system according to claim 7, wherein
the portable terminal displays, in the layout, a current position of the portable terminal and the position of the given registration object.

10. The light position registration system according to claim 7, wherein
the portable terminal updates the reference coordinates with the obtained coordinates of the portable terminal as new reference coordinates.

11. The light position registration system according to claim 7, wherein the portable terminal includes a set of selection buttons in which types of the plurality of registration objects are displayed as options, and
in response to one of the selection buttons being operated, the portable terminal obtains current position coordinates of the portable terminal, as the position coordinates of the given registration object, and stored the position coordinates in association with the type of the given registration object, the type of the given registration object corresponding to the operated one of the selection buttons.

* * * * *